Patented July 4, 1950

2,513,766

UNITED STATES PATENT OFFICE 2,513,766

PRODUCTION OF GLUTARIC ACID

Richard R. Whetstone, Berkeley, Calif., assignor to Shell Development Company, San Francisco, Calif., a corporation of Delaware No Drawing. Application May 25, 1948,
Serial No. 29,202

3 Claims. (Cl. 260—530)

This invention relates to the oxidation of alpha-hydroxyadipaldehyde to form glutaric acid.

An object of the present invention is to oxidize alpha-hydroxyadipaldehyde to selectively form glutaric acid. Another object is to obtain glutaric acid in high yields by the direct oxidation of alpha-hydroxyadipaldehyde. Yet another object of the invention is a novel and improved method for the production of glutaric acid. Further objects of the invention will become apparent hereinafter.

It unexpectedly has been discovered in accordance with the invention that glutaric acid may be produced in excellent yields by oxidizing an aqueous solution of alpha-hydroxyadipaldehyde by treatment with hydrogen peroxide. It has been surprisingly discovered that the glutaric acid may be produced as substantially the only non-volatile organic product of the oxidation. As a consequence of this discovery, the glutaric acid may be obtained in advantageously high yields from the alpha-hydroxyadipaldehyde, the yields generally being in the order of 80% or more, based upon the amount of alpha-hydroxyadipaldehyde employed in the execution of the process.

The formation of glutaric acid and the high yields of this compound that have been obtained, were unexpected results of the process of the invention. The results of the extensive study of oxidation of organic compounds with hydrogen peroxide described by Milas in British Patent 508,526, would suggest that aldehydes containing a hydroxyl group in the alpha position relative to a formyl group would, upon oxidation with hydrogen peroxide, form the alpha-hydroxy carboxylic acid containing the same number of carbon atoms as the hydroxy aldehyde. The patent would not have enabled one to foretell that the oxidation of alpha-hydroxyadipaldehyde according to the process of the present invention would lead to the formation of glutaric acid instead.

Because the glutaric acid is produced in the process of the present invention as substantially the only non-volatile organic product of the oxidation, the process is advantageous relative to prior art processes in which a plurality of non-volatile organic products including glutaric acid is produced. For example, it will be found that the non-volatile products of the oxidation in the present case generally contain the glutaric acid in a sufficient degree of purity to enable its utilization directly in various applications without requiring purification of the crude non-volatile oxidation products. On the other hand, if it is desired to further purify the glutaric acid produced by the process of the invention, the purification may be carried out very efficiently because of the absence of undesirably large amounts of non-volatile organic products of side reaction.

The oxidation of the alpha-hydroxyadipaldehyde may be effected in accordance with the invention by mixing, in one or a plurality of operations, or in a continuous manner, hydrogen peroxide in a suitable amount with an aqueous solution of the alpha-hydroxyadipaldehyde. A convenient form of hydrogen peroxide is the approximately 30% aqueous solution of commerce. However, more concentrated solutions may be employed, to and including even the substantially pure hydrogen peroxide that is becoming available on a commercial scale. Aqueous solutions of hydrogen peroxide less concentrated than the 30% solution may be used, although less desirably. For example, even the dilute, or about 3% aqueous solution of hydrogen peroxide that is commercially available may be employed, although the rate of oxidation may be retarded somewhat by the relatively low volume concentration of the oxidizing agent in the reaction mixture. The approximately 30% aqueous solution of hydrogen peroxide is preferred.

The alpha-hydroxyadipaldehyde may be prepared advantageously by hydrolyzing in a neutral to acidic solution, 3,4-dihydro-1,2-pyran-2-carboxaldehyde, as described in the copending application, Serial No. 694,144, filed August 30, 1946. The hydrolysis of the formyl dihydropyran may be carried out as an operation separate from and preceding the oxidation of the alpha-hydroxyadipaldehyde, or the hydrolysis and the oxidation of the hydrolysis product may be effected simultaneously, as by treating the formyl dihydropyran or aqueous, preferably acidic, mixtures containing it and the alpha-hydroxyadipaldehyde with neutral or acidulated solutions of hydrogen peroxide. It is preferred to employ the neutral to acidic aqueous solution of alpha-hydroxyadipaldehyde obtained by the hydrolysis of the 3,4-dihydro-1,2-pyran-2-carboxaldehyde and containing from about 15 to about 50% by weight of alpha-hydroxyadipaldehyde.

The oxidation may be effected by adding hydrogen peroxide to the aqueous solution of alpha-hydroxyadipaldehyde or by otherwise mixing the two materials. The amount of hydrogen peroxide should be not substantially less than the amount theoretically required by the oxidation, amounts not less than about 2.5 moles per mole of the alpha-hydroxyadipaldehyde being suitable. A convenient range is from about 3 to about 5 moles of hydrogen peroxide per mole of the hydroxydialdehyde to be oxidized. Larger amounts do no particular harm, but would be uneconomic. During the addition of the hydrogen peroxide and the subsequent reaction period, the temperature of the reaction mixture is maintained between about ordinary room temperatures (20–25° C.) and the boiling point of the mixture. A preferred range is from about 40° C. to about 90° C. A suitable procedure comprises commencing the reaction at about room temperatures and allowing the temperature of the reaction mixture to rise spontaneously (as a result of the heat liberated in the oxidation) to the upper portions of the temperature range, say from 60° C. to 80° C. The cycle may be repeated in the event the hydrogen peroxide is added in a plurality of portions. If excessive amounts of heat are evolved, the reaction mixture may be cooled as required, or the rate of heat evolution may be controlled by regulation of the rate of addition of the hydrogen peroxide to the mixture. Other expedients for regulating the temperature of the reaction mixture will be apparent to those skilled in the art to which the invention pertains.

The oxidation reaction starts smoothly and spontaneously upon mixing of the solution of alpha-hydroxyadipaldehyde and the hydrogen peroxide. It is not necessary to employ catalysts to effect the desired reaction; however in its generic concepts the invention does not exclude the presence of catalysts, e. g., suitable metal salts, in the reaction mixture.

It has been observed that in the execution of the process of the present invention, the reaction mixture, and hence the crude glutaric acid produced by the process, is colorless, that is, water white, or devoid of color-producing bodies. Accordingly, when the oxidation is completed a crude glutaric acid of high quality with respect to color (or freedom from color) may be obtained simply by evaporating off the water to leave the crude solids. Any suitable evaporator, e. g., a vacuum evaporator, of types well-known to the art may be employed. If desired, the evaporation may be interrupted prior to complete removal of the water, and glutaric acid allowed to crystallize from the partially evaporated solution. The purity of the "crude" product is such that a single recrystallization from a suitable organic solvent, e. g., benzene, generally affords a final product having a melting point in excellent agreement with the melting point of highly refined glutaric acid.

The following example will illustrate the invention. It will be understood that the example is intended to be only illustrative, and that the invention includes the equivalents and modifications thereof that are within the scope of the appended claims.

*Example*

A mixture of 267 parts by weight of 3,4-dihydro-1,2-pyran-2-carboxaldehyde with 560 parts by weight of 0.0216 normal sulfuric acid solution (aqueous) was held at room temperature for 2½ hours. An excess of calcium carbonate then was added to neutralize the acid, and the mixture filtered. To the filtrate, containing alpha-hydroxyadipaldehyde (about 90% based on the formyl dihydropyran employed), there was added 840 parts of 30% aqueous hydrogen peroxide solution in six equal portions at regular intervals over a period of 48 hours and at temperatures up to 80° C. from room temperature. After the addition of the last portion, the mixture was held at 80° C. for an additional 8 hours. The resulting solution was evaporated in vacuo, leaving 313 parts of white solid. The solid product was found to have an equivalent weight of 70.2 which, in terms of glutaric acid, indicates a purity of 95% and a conversion to crude glutaric acid of 89% based upon the amount of the formyl dihydropyran employed. The crude product was purified by filtration of a solution thereof in diethyl ether, removal of the ether, and crystallization of the residue from benzene. After one recrystallization from benzene the product melted at 97° C., the value reported in the literature for the melting point of glutaric acid. Yield of purified product: 242 parts, corresponding to a conversion to the acid of 77%.

I claim as my invention:

1. In a process for the production of glutaric acid, adding in a plurality of increments to an aqueous solution of alpha-hydroxyadipaldehyde an aqueous solution of hydrogen peroxide having a concentration of hydrogen peroxide of about 30%, by weight, in an amount corresponding to from about 3 to about 5 moles of hydrogen peroxide per mole of alpha-hydroxyadipaldehyde at temperatures within the range of from 40° C. to 90° C. and continuing the ensuing reaction for a time such that appreciable and substantial quantities of glutaric acid are formed in the reaction mixture, and then terminating the reaction.

2. In the production of glutaric acid, the improvement which comprises mixing an aqueous solution of alpha-hydroxyadipaldehyde and an aqueous solution of hydrogen peroxide having a concentration of hydrogen peroxide of about 30%, by weight, at temperatures within the range of from about 40° C. to about 90° C. in amounts corresponding to from about 2.5 to about 5 moles of hydrogen peroxide per mole of alpha-hydroxyadipaldehyde, and continuing the ensuing reaction at temperatures within said range for a time such that appreciable and substantial quantities of glutaric acid are formed in the reaction mixture, and recovering the glutaric acid from the resulting mixture.

3. In the production of glutaric acid, the improvement which comprises mixing an aqueous solution of alpha-hydroxyadipaldehyde and aqueous hydrogen peroxide having a concentration not less than about 3%, by weight, of hydrogen peroxide, at temperatures within the range of from about 20° C. up to the boiling point of the reaction mixture in amounts corresponding to not less than about 2.5 moles of hydrogen peroxide per mole of alpha-hydroxyadipaldehyde, and continuing the ensuing reaction at temperatures within said range for such a time that appreciable and substantial quantities of glutaric acid are formed in the reaction mixture.

RICHARD R. WHETSTONE.

REFERENCES CITED

The following references are of record in the file of this patent:

UNITED STATES PATENTS

| Number | Name | Date |
|---|---|---|
| 1,880,901 | Drössbach | Oct. 4, 1932 |
| 1,956,482 | Zumstein | Apr. 24, 1934 |
| 2,389,950 | Bremner et al. | Nov. 27, 1945 |
| 2,437,648 | Milas | Mar. 9, 1948 |

FOREIGN PATENTS

| Number | Country | Date |
|---|---|---|
| 508,526 | Great Britain | July 3, 1939 |
| 875,295 | France | Sept. 14, 1942 |
| 881,993 | France | May 13, 1943 |